(12) United States Patent
Kibria et al.

(10) Patent No.: US 6,584,175 B1
(45) Date of Patent: Jun. 24, 2003

(54) METHOD AND APPARATUS FOR SPECTRUM ANALYSIS

(75) Inventors: Masud Kibria, Kirkland, WA (US); Michael Allen Raffel, Redmond, WA (US)

(73) Assignee: AT&T Wireless Services, Inc., Redmond, WA (US)

( * ) Notice: Subject to any disclaimer, the term of this patent is extended or adjusted under 35 U.S.C. 154(b) by 0 days.

(21) Appl. No.: 09/439,015

(22) Filed: Nov. 12, 1999

Related U.S. Application Data

(63) Continuation of application No. 08/525,873, filed on Sep. 8, 1995, now abandoned.

(51) Int. Cl.$^7$ .......................... H04M 1/24; H04M 3/08; H04M 3/22
(52) U.S. Cl. ................ 379/1.03; 379/1.01; 455/226.02; 455/67.1; 455/419
(58) Field of Search .............................. 379/1.01, 1.03; 455/67.1–67.4, 422–425, 437, 456–457, 226.1, 226.2, 226.4, 418, 419

(56) References Cited

U.S. PATENT DOCUMENTS

| | | | |
|---|---|---|---|
| 4,868,885 A | * | 9/1989 | Perry |
| 5,023,900 A | * | 6/1991 | Tayloe et al. |
| 5,375,123 A | * | 12/1994 | Andersson et al. |
| 5,398,276 A | * | 3/1995 | Lemke et al. |
| 5,428,671 A | * | 6/1995 | Dykes et al. |
| 5,732,354 A | * | 3/1998 | MacDonald |

* cited by examiner

Primary Examiner—Duc Nguyen
(74) Attorney, Agent, or Firm—Klarquist Sparkman, LLP

(57) ABSTRACT

A method and apparatus for remote spectrum analysis is disclosed. A channel measurement device is configured to receive and measure the radio spectrum in a geographic location during a measurement phase of operation. A microprocessor processes the signals and stores processed data on a storage device. The channel measurement device contains a communications interface to a land line telephone network and/or a cellular telephone network. During a data transfer phase of operation, the channel measurement device sends the processed data to a remote processor via the land line or cellular telephone network. In addition, the remote processor may act as a remote user interface to control the operation of the channel measurement device. In particular, the remote processor may be used to store values for user programmable configuration parameters in a memory of the channel measurement device via the land line or cellular telephone network. In one embodiment, the cellular telephone network interface may include the components necessary for communicating directly with the cellular telephone network. In another embodiment, the cellular telephone network interface is capable of connecting to a cellular telephone for such communication with the cellular telephone network.

16 Claims, 2 Drawing Sheets

METHOD AND APPARATUS FOR SPECTRUM ANALYSIS

This is a continuation of application No. 08/525,873, filed Aug. 9, 1995, now abandon.

FIELD OF THE INVENTION

The present invention relates generally to a method and apparatus for radio spectrum analysis. More particularly, the present invention relates to a method and apparatus for remote radio spectrum analysis.

BACKGROUND OF THE INVENTION

Wireless communications in general, and cellular telephone systems in particular, are becoming increasingly popular. As a result, cellular telephone systems are becoming increasingly complex. These systems are generally made up of cell sites, each of which serves a coverage area, or cell. The cell site is the location within a cell which contains the required hardware (e.g. antenna(s) and radio base station) to communicate with mobile telephones. A mobile telephone operating within a particular cell in the system communicates with the mobile telephone system through the cell site covering that cell. The various cell sites are connected to a mobile telephone switching office which connects the cellular telephone network to the land line telephone network.

Cellular telephone system providers are generally licensed to operate a cellular telephone network in a particular geographic area using a specified frequency spectrum for radio communication between mobile telephones and the base stations. For example, a typical cellular system provider may have a license to operate in a 12.5 MHz spectrum. This spectrum may be divided into 416 channels, each 30 KHz wide. Each of these 416 channels is capable of handling the communication between one mobile telephone and a radio base station. For further information on this air interface, see, EIA/TIA Standard 553, "Mobile Station-Land Station Compatibility Specification", September 1989, Electronic Industries Association, Washington, D.C.; EIA/TIA Interim Standard IS-54-B "Cellular System Dual-Mode Mobile Station Basestation Compatibility Standard", April, 1992, Electronic Industries Association, Washington, D.C.; and EIA Interim Standard IS-136 "Cellular System Dual-Mode Mobile Station-Basestation: Digital Control Channel Compatibility Standard", April, 1995, Electronic Industries Association, Washington, D.C.

A fixed channel cellular system is a cellular system in which each cell is assigned a fixed group of channels for communication. For example, if each cell were assigned one group of 16 channels, there could be a maximum of 26 (16×26=416) cells carrying the permissible 416 calls in the serving area if there was no reuse of channels. However, if cells are sufficiently spaced apart, in terms of geographic ground distance, channels can be reused in multiple cells without overlap. Designing a fixed cell system which reuses channels is a complex task. In addition, once a system is in place, it is often necessary to add cells to the system as communication traffic increases. The addition of a cell is also a complex task, and it requires an analysis of the radio spectrum of the area in which the cell is to be added.

To more efficiently use the limited frequency spectrum, schemes other than fixed channel systems are also being studied. One such scheme is called adaptive channel allocation. In an adaptive channel allocation system, the cells are not assigned a fixed group of channels. Instead, the cellular system is self organizing in that each cell dynamically determines which channels it will use for communication. Thus, the system adapts itself based upon the communication traffic. The development and testing of these adaptive channel allocation systems require a detailed analysis of the spectrum profile in the area under consideration.

As seen from the above discussion, spectrum analysis is required during the design and maintenance of cellular telephone networks. Presently, when an engineer needs spectrum analysis information, a technician is sent to the location in question with spectrum measurement equipment. The technician must program the device to take the appropriate measurements. For example, the engineer may only be interested in measuring a certain portion of the spectrum. Once correctly programmed, the device is capable of measuring the spectrum, or portion thereof, and storing spectrum data on storage media, such as a magnetic disk. The disk can then be sent to the engineer for analysis. One disadvantage of this type of device is that it needs to be reprogrammed by a technician on site when it is moved from one location to another and when different measurements are required. Another disadvantage occurs because an engineer is often interested in measuring the spectrum at a location that is remote from the engineers location. In such a situation, the data must be stored on a storage device and physically sent to the engineer.

Thus, there is a need for a remote spectrum measuring device which can be remotely programmed and which can automatically transmit measurement data over a communication network to an end user at a remote location.

SUMMARY OF THE INVENTION

The present invention provides a method and apparatus for remote spectrum analysis. During a measurement phase, a channel measurement device measures signal information in a geographic area. Data representing the measured signal information is stored in a storage device. During a data transfer phase, the stored data is transmitted to a remote processor via a communications network. Thus, a user at a remote location can analyze the data measured by the channel measurement device. The communications network used for the data transfer may be, for example, a land line telephone network or a cellular telephone network.

Various functions of the channel measurement device may be controlled by a user at a remote location. The functions of the channel measurement device are controlled in part by user programmable configuration parameters. These parameters may be set by a user at a remote location using a remote processor. The remote processor sends the configuration parameter values to the channel measurement device via the communications network.

These and other advantages of the invention will be apparent to those of ordinary skill in the art by reference to the following detailed description and the accompanying drawings.

DETAILED DESCRIPTION

Figure 1:
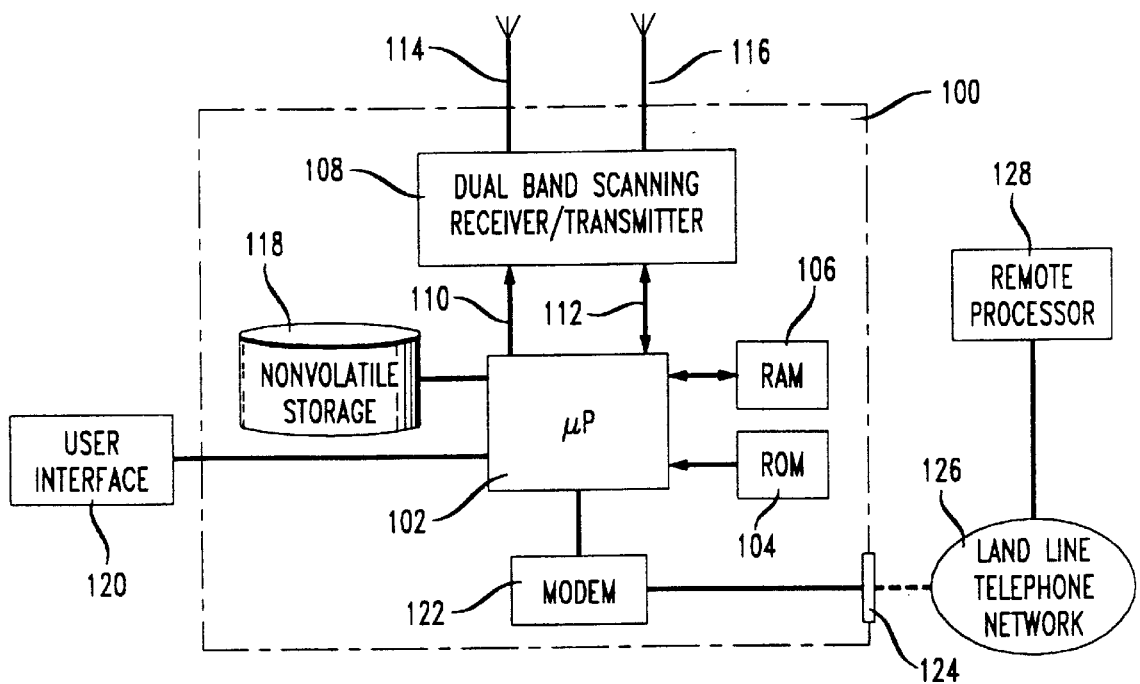
FIG. 1 shows a first embodiment of a channel measurement device which communicates with a remote processor via a land line telephone network.

A first embodiment of a channel measurement device in accordance with the present invention is shown as 100 in FIG. 1. The functions of the channel measurement device 100 are controlled by a microprocessor 102. The microprocessor 102 is connected to a read only memory (ROM) 104, which contains stored computer program instructions. The functions of the channel measurement device 100 are controlled by the microprocessor 102 executing the computer program instructions which are stored in the ROM 104. The microprocessor 102 is also connected to random access memory (RAM) 106. The RAM 106 stores data used by the microprocessor 102 during processing. The RAM 106 also stores values for user configurable parameters. These user configurable parameters allow the channel measurement device 100 to be configured differently depending upon the particular measurement application. These parameters will be discussed in further detail below.

The microprocessor 102 is also connected to a dual band scanning receiver/transmitter 108 by control line 110 and data line 112. The dual band scanning receiver/transmitter 108 is connected to a 1.9 GHz antenna 114 and a 900 MHz antenna 116, which are used to receive radio signals. The microprocessor 102 is connected to a non-volatile storage device 118, which is used for the storage of data. The non-volatile storage device may be of any of the types which are well known in the art (e.g. magnetic disk, optical disk, magnetic tape, etc.). A user interface 120 is connected to the microprocessor 102. The user interface 120 provides for user input/output to the channel measurement device 100. The user interface 120 may contain components which are well known in the art for user input/output (e.g. CRT or LCD monitor, keyboard, mouse, etc.). The microprocessor 102 is also connected to a modem 122 which is connected to a land line telephone interface 124, which provides for communication with a land line telephone network 126 and a remote processor 128. The functioning of the channel measurement device 100 is as follows.

The channel measurement device 100 is used to measure the radio spectrum in the location in which it is operating. The microprocessor 102 executes computer program code stored in the ROM 104 to control the functioning of the channel measurement device 100. This program code includes the measurement algorithm which will allow the channel measurement device 100 to measure the radio spectrum for the location. The user configurable parameters for each measurement task are programmable by the user through either the user interface 120 or through the remote processor 128 as follows.

As described above, the user interface 120 is connected to the microprocessor 102. Under microprocessor 102 control, a user may program the user configurable parameters into the RAM 106 via the user interface 120. Alternatively, a user may use the remote processor 128 to configure the user parameters in RAM 106. The remote processor 128 connects to the land line telephone interface 124 through the land line telephone network 126. The land line telephone interface 124 is connected to the modem 122 which allows the remote processor to communicate with the microprocessor 102. In addition to the setting of user configurable parameters, the remote processor can control other functions of the channel measurement device 100 as well. Generally, the remote processor 128 can function in a manner similar to the user interface 120. Such remote communication between two processors over a telephone network is well known in the art.

The programmable user parameters allow the channel measurement device 100 to be configured differently for different measurement tasks. One of the user programmable parameters is a channel parameter, which defines the channels which will be measured by the channel measurement device 100. For example, the user may only be interested in channels A, B, and C during a particular measurement session. The user would program the appropriate frequency values, corresponding to channels A, B, and C, into the RAM through the remote processor 128 or the user interface 120. In addition, the user may define a cycle period parameter which defines the amount of time that each channel is to be sampled. For example, the user may program this parameter to indicate that the channel measurement device 100 is to sample a channel for 10 seconds and then cycle to the next channel. Another user configurable parameter is the total measurement time parameter, which defines the total time that the channel measurement device is to measure the defined channels.

The dual band scanning receiver/transmitter 108 is configured by the microprocessor 102 over control line 110 to measure the spectrum information for signals on a particular channel, or channels, using either the 1.9 GHz antenna 114 or the 900 MHz antenna 116. It is advantageous to use two antennas because each antenna may be tuned to effectively measure a particular frequency range, as is well known in the art. The measurements are passed to the microprocessor 102 via data line 112.

The channel measurement device 100 can be configured to measure various aspects of the radio spectrum. For example, the channel measurement device 100 can measure signal characteristics, such as signal strength. In addition to measuring signal characteristics, the channel measurement device 100 can also measure the information content of the signals which are being communicated through a channel. For example, in typical cellular telephone systems, various information is passed between the mobile telephone and a mobile telephone switching office/base station over the communication channels, e.g. a page on the forward control channel as specified in EIA Standard 553. Measuring different aspects of the spectrum is advantageous for various spectrum analysis purposes. The term signal information is used herein to describe either signal characteristics or the information content of the signals, or both. The particular measurement function of the channel measurement device 100 can be controlled through the use of a user configurable parameter.

As described above, the list of channels to be measured are stored in the RAM 106 as a user configurable channel parameter. Each channel is measured for time intervals defined by the cycle period parameter. At the end of each cycle period, the microprocessor 102 processes the measured data and stores the processed data in the non-volatile storage device 118. For example, the microprocessor 102 may process the measured data by calculating an average of the measured signal information during the cycle period. The microprocessor 102 then sends a control signal over line 110 to reconfigure the dual band scanning receiver/ transmitter 108 to measure the next channel for the cycle period. This measurement process continues for the time period defined by the total measurement time parameter.

Another set of user configurable parameters defines the data transfer protocol of the channel measurement device 100. One such parameter is the data transfer time parameter which defines the timing of the data transfer from the channel measurement device 100 to the remote processor 128. There are several possibilities for the value of this parameter. First, it may specify a particular time at which the data transfer is to take place. Second, it may specify that the data transfer is to take place at the end of the measurement period. Third, it may specify that the data transfer is to take place upon initiation by the user. If this third option is used, the data transfer will not take place until the user initiates such an action, either through the user interface 120 or the remote processor 128.

The microprocessor 102 controls the transfer of the data as follows. As described above, signal information data, which was collected and processed during the measurement phase, is stored in the non-volatile storage device 118. The microprocessor 102 reads the stored data from the nonvolatile storage device 118 and sends the data to the remote processor 128 via the modem 122, the land line telephone interface 124, and the land line telephone network 126. The land line telephone interface 124 may be a standard RJ-11 interface. The data may be transferred over the land line telephone network using any one of a variety of transfer protocols which are well known in the art. The particular transfer protocol to be used may be defined by a user configurable protocol parameter stored in RAM 106.

The end user may then process the data as desired at the remote processor 128.

Figure 2:
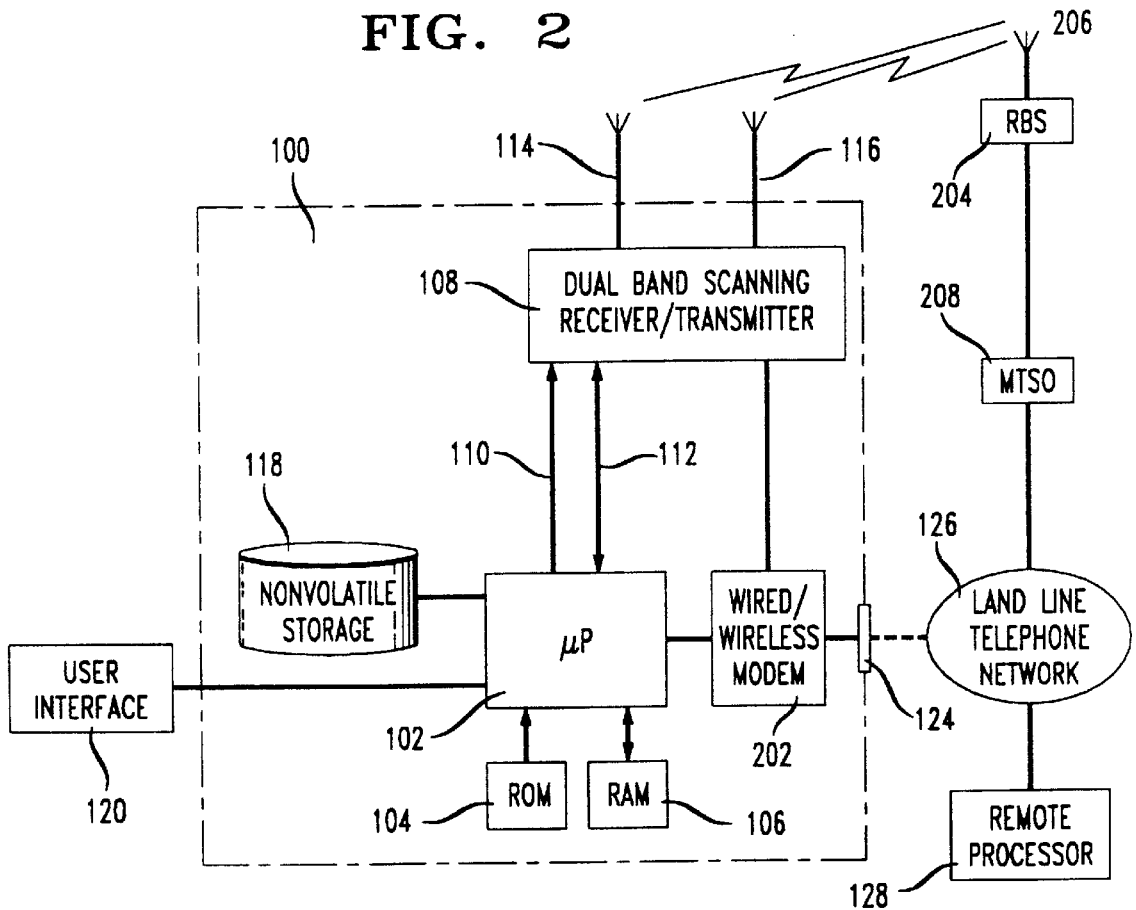
FIG. 2 shows a second embodiment of a channel measurement device which communicates with a remote processor via a land line telephone network or a cellular telephone network.

A second embodiment of the invention is shown in FIG. 2 and provides an alternate means of communication between the channel measurement device 100 and the remote processor 128. (Like numbered elements in FIGS. 1 and 2 perform like functions and will not be described again in conjunction with FIG. 2.) In FIG. 2, a wired/wireless modem 202 replaces the modem 122 described above in conjunction with FIG. 1. The wired/wireless modem 202 is connected to microprocessor 102, the dual band scanning receiver/transmitter 108, and the land line telephone interface 124. The wired/wireless modem 202 is capable of converting digital signals from the microprocessor 102 to a format appropriate for transfer over the land line telephone network 126 as well as the cellular telephone network. Such a dual purpose modem is well known in the art. This provides for an alternate means of communication between the channel measurement device 100 and the remote processor 128, using a cellular telephone network. Using this method of communication for data transfer, the microprocessor 102 reads the stored data from the non-volatile storage device 118 and sends the data to the wired/wireless modem 202. The wired/wireless modem converts the digital data from the microprocessor 102 to a data format appropriate for transfer over the cellular telephone network. The data is sent from the wired/wireless modem 202 to the cellular telephone network via the dual band scanning receiver/transmitter 108 and the antennas 114 or 116. The particular antenna 114 or 116 will depend on the frequency on which the data is being sent. Cellular telephone networks are well known in the art and typically contain a plurality of radio base stations (RBS), such as RBS 204. The RBS 204 is connected to an antenna 206 which sends and receives radio signals from antennas 114 and/or 116. The RBS 204 is connected to a mobile telephone switching office (MTSO) 208. The MTSO 208 is connected to the land line telephone network 126. Thus, in this second embodiment, the channel measurement device 100 is capable of sending the data stored in the non-volatile storage device 118 to the remote processor 128 via a cellular telephone network.

Similarly, the remote processor 128 can send data to the channel measurement device 100 through the cellular telephone network. As described above in conjunction with FIG. 1, the RAM 106 contains user configurable parameters which control various functions of the channel measurement device 100. In the embodiment shown in FIG. 2, these parameters can be programmed remotely from the remote processor 128 over the cellular telephone network. The remote processor 128 sends configuration data to the channel measurement device 100 via the land line telephone network 126, the MTSO 208, the RBS 204, and antenna 206. The channel measurement device 100 receives radio signals from the cellular telephone network antenna 206 via antennas 114 and/or 116 and the dual band scanning receiver/transmitter 108. These signals are sent to the wired/wireless modem 202 to be converted into a format appropriate for processing by the microprocessor 102. The microprocessor stores the data in RAM 106 as configuration parameter data. In addition to the setting of user configurable parameters, communication over the cellular telephone network may also be used to allow the remote processor 128 to control other functions of the channel measurement device 100. As discussed above, the remote processor 128 can act as a remote user interface, in a manner similar to user interface 120.

Figure 3:
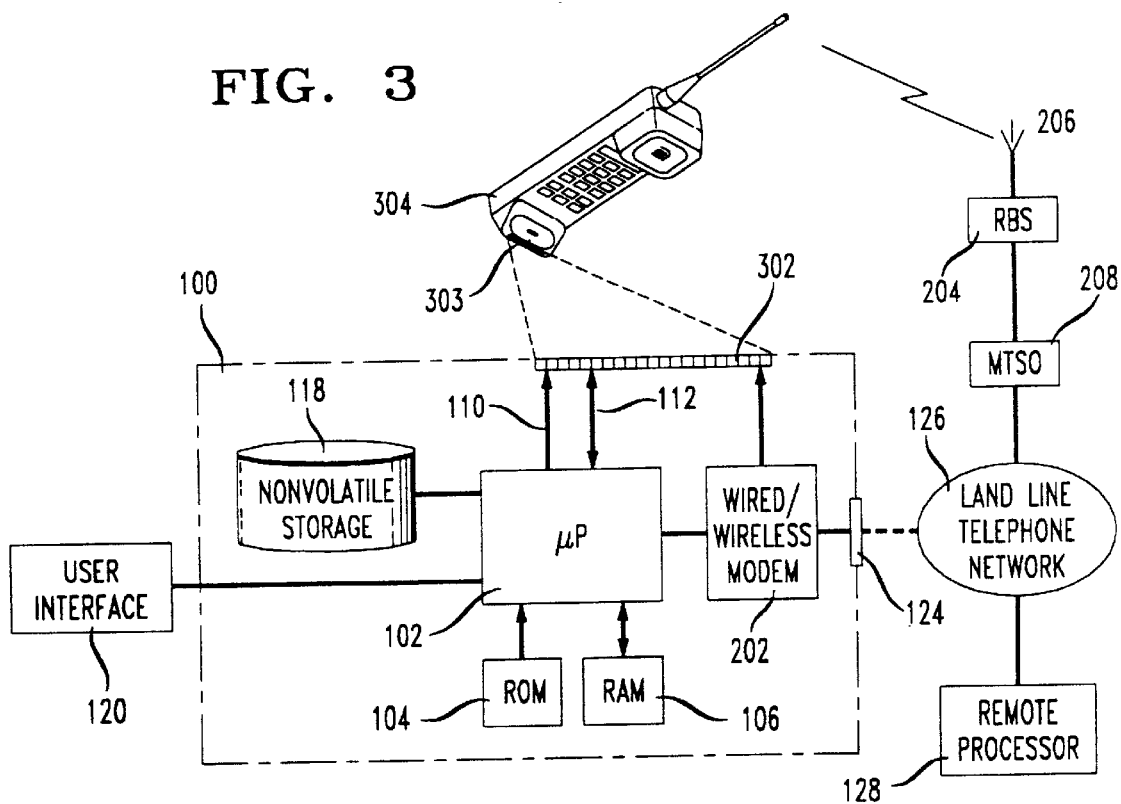
FIG. 3 shows a third embodiment of a channel measurement device which communicates with a remote processor via a land line telephone network or a cellular telephone network using a cellular telephone connected to the channel measurement device.

A third embodiment of the invention is shown in FIG. 3. (Like numbered elements in FIGS. 1, 2 and 3 perform like functions and will not be described again in conjunction with FIG. 3.) In this embodiment, the microprocessor 102 is connected to a dual band cellular telephone interface 302 by control line 110 and data line 112. In addition, the dual band cellular telephone interface 302 is connected to the wired/wireless modem 202. The dual band cellular telephone interface 302 is a connection port which allows the channel measurement device 100 to connect to a dual band cellular telephone 304 which has a port 303 configured to connect to the dual band cellular telephone interface 302. The dual band cellular telephone interface 302 allows the dual band cellular telephone 304 to communicate with the microprocessor 102 and the wired/wireless modem 202. The microprocessor 102 controls the dual band cellular telephone's 304 functionality by sending control signals to the dual band cellular telephone 304 over control line 110. Such signals are received by a processor in the dual band cellular telephone 304 which interprets the control signals and controls the functions of the dual band cellular telephone 304 accordingly. The cellular telephone 304 is dual band in that it can send and receive signals at both 1.9 GHz and 900 MHz, similar to antennas 114 and 116 shown in FIGS. 1 and 2.

This third embodiment is similar to the second embodiment in that the channel measurement device 100 can communicate with the remote processor 128 via a cellular telephone network However, the components which allow for such communication in the second embodiment shown in FIG. 2 (dual band scanning receiver/transmitter 108, and antennas 114 and 116) are replaced with the dual band cellular telephone interface 302. When a dual band cellular telephone 304 is connected to the channel measurement device 100 via dual band cellular telephone interface 302, the channel measurement device 100 is capable of communicating with the cellular telephone network.

In this third embodiment, the channel measurement device 100 also uses the dual band cellular telephone 304 to measure the radio spectrum during the measurement phase of operation. The dual band cellular telephone 304 is controlled through control line 110. The microprocessor 102 uses control line 110 and the dual band cellular telephone interface 302 to configure the dual band cellular telephone 304 to measure the appropriate channels during the measurement phase. These measurements are passed to the microprocessor 102 through the dual band cellular telephone interface 302 and data line 112. The measurements are then processed by the microprocessor 102 as described above.

During the data transfer phase, the microprocessor 102 reads the stored data from the non-volatile storage device 118 and sends the data to the wired/wireless modem 202. The wired/wireless modem 202 converts the data from the microprocessor 102 to a data format appropriate for transfer over the cellular telephone network. Such a data conversion by the wired/wireless modem 202 is a well known technique. The data is sent from the wired/wireless modem 202 to the dual band cellular telephone 304 via the dual band cellular telephone interface 302. During this phase, the microprocessor 102 configures the cellular telephone 304, via control line 110 and dual band cellular telephone interface 302, to transmit the measurement data over the cellular telephone network. This transfer of data to the remote processor 128 via the cellular telephone network is as described above in conjunction with FIG. 2.

In a manner similar to the second embodiment, the remote processor 128 can send data to the channel measurement device 100 through the cellular telephone network. Thus, the remote processor 128 would send configuration data to the channel measurement device 100 via the land line telephone network 126, the MTSO 208, the RBS 204, and antenna 206. The channel measurement device 100 receives signals via the dual band cellular telephone 304 connected to the dual band cellular interface 302. These signals are sent to the wired/wireless modem 202 to be converted into a format appropriate for processing by the microprocessor 102. The microprocessor stores the data in RAM 106 as configuration parameter data.

Figure 4:
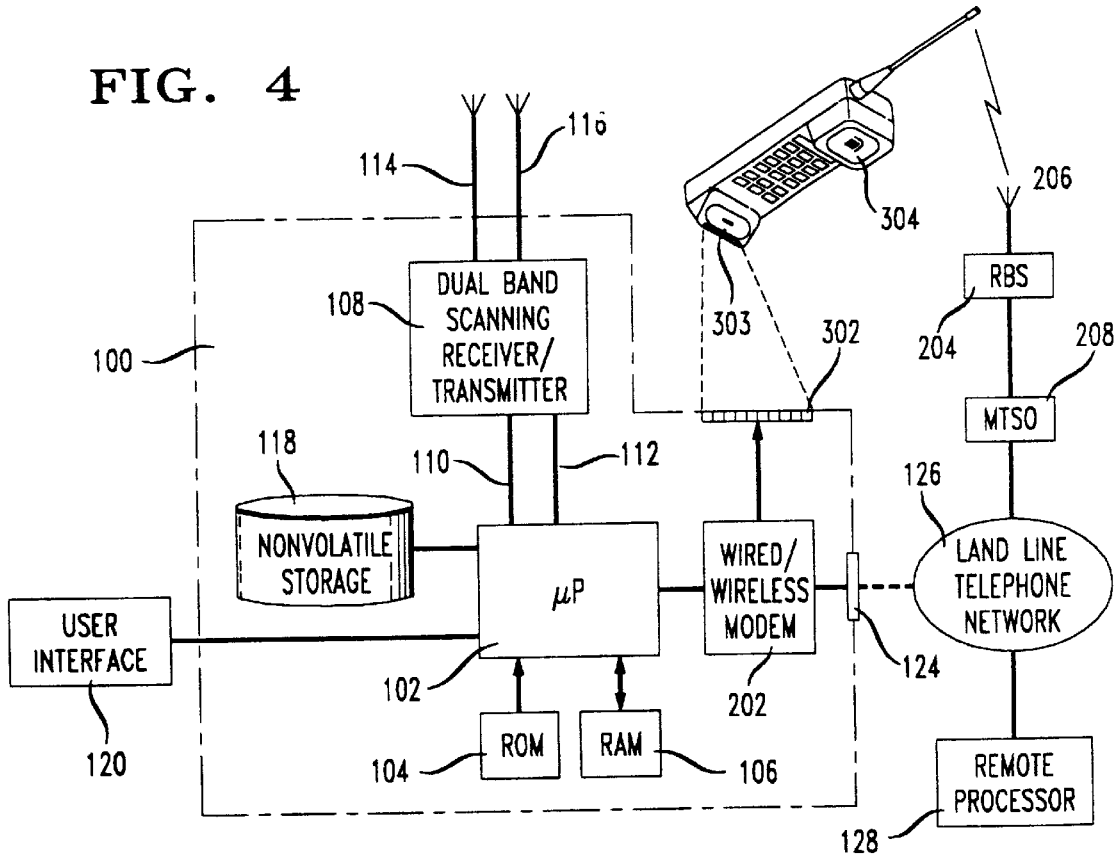
FIG. 4 shows a fourth embodiment of a channel measurement device which communicates with a remote processor via a land line telephone network or a cellular telephone network using a cellular telephone connected to the channel measurement device.

A fourth embodiment of the invention is shown in FIG. 4. (Like numbered elements in FIGS. 1, 2, 3 and 4 perform like functions and will not be described again in conjunction with FIG. 4.) Both 1) the dual band scanning receiver/transmitter 108 and antennas 114 and 116 and 2) a dual band cellular telephone interface 302 are included in the channel measurement device 100. In this embodiment, the channel measurement device 100 measures the radio spectrum using the dual band scanning receiver/transmitter 108 and antennas 114 and 116 as described above in conjunction with FIG. 1. The channel measurement device 100 uses the dual band cellular telephone interface 302 (along with a connected dual band cellular telephone 304) to communicate with the remote processor 128 via the cellular telephone network as described above in conjunction with FIG. 3.

In the second, third, and fourth embodiments as shown in FIGS. 2, 3, and 4, respectively, the communication between the channel measurement device 100 and the remote processor 128 via the cellular telephone network is an alternate means of communication. In these embodiments, communication between the channel measurement device 100 and the remote processor 128 may also take place via the land line telephone interface 124 and the land line telephone network 126 as described in conjunction with the first embodiment and FIG. 1.

Further, the land line telephone network 126 is only one type of land line communications link between the channel measurement device 100 and the remote processor 128. As an alternate to a network, the channel measurement device 100 could communicate with the remote processor 128 via a dedicated land line. Similarly, the cellular telephone network is only one type of wireless communications link between the channel measurement device 100 and the remote processor 128. As an alternative, the channel measurement device 100 could communicate with the remote processor 128 via a dedicated frequency.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention.

We claim:

1. An apparatus for spectrum analysis, comprising:

a cellular telephone; and a channel measurement device that includes a memory, a processor coupled to the memory, and a cellular telephone interface, the processor, memory, and cellular telephone interface adapted such that signal measurements made by the cellular telephone are provided to the memory for storage via the cellular telephone interface, and such that configuration parameters received via the cellular telephone and the cellular telephone interface are provided to the memory for storage and applied by the processor to configure signal measurement by the cellular telephone.

2. The apparatus of claim 1, wherein the processor, memory, and cellular telephone interface are further adapted such that the signal measurements made by the cellular telephone and stored in the memory are provided to the cellular telephone by the channel measurement device via the cellular telephone interface for communication to a remote processor.

3. The apparatus of claim 1, the configuration parameters comprising:

identifications of channels for the cellular telephone to measure.

4. The apparatus of claim 3, the configuration parameters comprising:

an amount of time for the cellular telephone to spend measuring each of the channels.

5. The apparatus of claim 3, the configuration parameters comprising:

a total time to spend measuring the channels.

6. The apparatus of claim 3, the configuration parameters comprising:

a time at which the signal measurements are to be provided to the cellular telephone for transfer to the remote processor.

7. A method for spectrum analysis, comprising:

receiving, via a cellular telephone, configuration parameters to configure the measurement of a radio spectrum;

providing the configuration parameters to a channel measurement device via a cellular telephone interface;

applying the configuration parameters to the cellular telephone with the channel measurement device via the cellular telephone interface;

measuring the radio spectrum with the cellular telephone according to the configuration parameters to produce signal measurements;

storing the signal measurements in a memory of the channel measurement device;

providing the stored signal measurements to the cellular telephone with the channel measurement device; and communicating the stored signal measurements to a remote processor with the cellular telephone.

8. The method of claim 7, the configuration parameters comprising:

identifications of channels for the cellular telephone to measure.

9. The method of claim 7, the configuration parameters comprising:

an amount of time for the cellular telephone to spend measuring each of the channels.

10. The method of claim 7, the configuration parameters comprising:

a total time to spend measuring the channels.

11. The method of claim 7, the configuration parameters comprising:

a time at which the signal measurements are to be provided to by the channel measurement device to the cellular telephone for transfer to the remote processor.

12. A channel measurement device, comprising:

a cellular telephone interface;

a processor coupled to receive, via the cellular telephone interface, signal measurement configuration parameters, the processor further coupled to receive, via the cellular telephone interface, signal measurements generated by a cellular telephone;

a memory coupled to receive the signal measurements from the processor and to store the signal measurements; and a wireless modem coupled to receive the signal measurements from the memory and adapted to convert the signal measurements to a format appropriate for transfer over a cellular telephone network, the wireless modem coupled to communicate the converted signal measurements to the cellular telephone via the cellular telephone interface.

13. The apparatus of claim 1 wherein the channel measurement device includes a wireless modem coupled to receive the configuration parameters from the cellular telephone, the wireless modem adapted to convert the configuration parameters to a format appropriate for processing by the processor.

14. The apparatus of claim 13 wherein the wireless modem and the processor are coupled to the cellular telephone via the cellular telephone interface.

15. The method of claim 7 further comprising:

providing the configuration parameters to a wireless modem to convert the configuration parameters to a format appropriate for processing by the channel measurement device.

16. The method of claim 7 further comprising:

receiving the signal measurements from the memory and converting the signal measurements to a format appropriate for transfer over a cellular telephone network; and communicating the converted signal measurements to the cellular telephone via the cellular telephone interface.

* * * * *